United States Patent
Nishisaka et al.

(10) Patent No.: US 9,892,854 B2
(45) Date of Patent: Feb. 13, 2018

(54) MULTILAYER CERAMIC CAPACITOR AND METHOD FOR MANUFACTURING THE SAME

(71) Applicant: Murata Manufacturing Co., Ltd., Nagaokakyo-shi, Kyoto-fu (JP)

(72) Inventors: Yasuhiro Nishisaka, Nagaokakyo (JP); Yoshito Saito, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 56 days.

(21) Appl. No.: 15/067,459

(22) Filed: Mar. 11, 2016

(65) Prior Publication Data

US 2016/0268046 A1    Sep. 15, 2016

(30) Foreign Application Priority Data

Mar. 12, 2015  (JP) ................................. 2015-049725
Feb. 4, 2016  (JP) ................................. 2016-020163

(51) Int. Cl.
*H01G 4/228* (2006.01)
*H01G 4/008* (2006.01)
(Continued)

(52) U.S. Cl.
CPC .............. *H01G 4/2325* (2013.01); *H01G 4/12* (2013.01); *H01G 4/232* (2013.01); *H01G 4/30* (2013.01); *H01G 4/0085* (2013.01)

(58) Field of Classification Search
CPC .............................. H01G 4/228; H01G 4/232
See application file for complete search history.

(56) References Cited

U.S. PATENT DOCUMENTS

2004/0257748 A1* 12/2004 Ritter ..................... H01G 4/012
                                                361/306.3
2010/0328842 A1  12/2010 Takeuchi et al.
(Continued)

FOREIGN PATENT DOCUMENTS

JP    2002-110451 A    4/2002
JP    2006-213946 A    8/2006
(Continued)

OTHER PUBLICATIONS

Official Communication issued in corresponding Korean Patent Application No. 10-2016-0025486, dated Mar. 15, 2017.

*Primary Examiner* — Eric Thomas
(74) *Attorney, Agent, or Firm* — Keating & Bennett, LLP

(57) ABSTRACT

A multilayer ceramic capacitor contains Ni in internal electrodes, and includes a sintered metal layer containing Cu in external electrodes. At a joined portion between each internal electrode and each external electrode, mutual diffusion layers of Cu and Ni extend across the internal and external electrodes. On each internal electrode, a mutual diffusion layer is present with a thickness t1, which is defined by a dimension from a first end surface or a second end surface to an interior end in a longitudinal direction, not smaller than about 0.5 μm and not greater than about 5 μm. On each external electrode, a mutual diffusion layer is present with a thickness t2, which is defined by a dimension from the first end surface or the second end surface to an exterior end in the longitudinal direction, not smaller than about 2.5% and not greater than about 33.3% of a thickness t0 of a sintered metal layer.

20 Claims, 4 Drawing Sheets

(51) Int. Cl.
*H01G 4/232* (2006.01)
*H01G 4/30* (2006.01)
*H01G 4/12* (2006.01)

(56) References Cited

U.S. PATENT DOCUMENTS

| | | |
|---|---|---|
| 2012/0057272 A1 | 3/2012 | Hirata et al. |
| 2014/0233149 A1* | 8/2014 | Jeon ........................ H01G 4/005 361/301.4 |
| 2015/0034701 A1* | 2/2015 | Takaoka ............... H01G 4/2325 228/101 |
| 2015/0136463 A1* | 5/2015 | Lee ........................ H01G 4/005 174/260 |
| 2016/0071647 A1* | 3/2016 | Nishisaka ................ H01G 4/30 361/301.4 |

FOREIGN PATENT DOCUMENTS

| | | |
|---|---|---|
| JP | 2011-009478 A | 1/2011 |
| JP | 2012-059742 A | 3/2012 |

\* cited by examiner

MULTILAYER CERAMIC CAPACITOR AND METHOD FOR MANUFACTURING THE SAME

BACKGROUND OF THE INVENTION

1. Field of the Invention

The present invention relates to a ceramic capacitor and a method for manufacturing the ceramic capacitor, and particularly to a multilayer ceramic capacitor having a structure in which external electrodes are arranged on a ceramic body including internal electrodes to be electrically connected to the internal electrodes, and to a method for manufacturing the multilayer ceramic capacitor.

2. Description of the Related Art

One representative ceramic electronic component is a multilayer ceramic capacitor as disclosed in Japanese Patent Laying-Open No. 2006-213946, for example.

As shown in FIG. 4, this multilayer ceramic capacitor has a structure including a ceramic stack (ceramic body) 110 in which a plurality of internal electrodes 102 (102a, 102b) are stacked with a ceramic layer 101 as a dielectric layer being interposed, and a pair of external electrodes 104 (104a, 104b) provided on a pair of end surfaces 103 (103a, 103b), respectively, of ceramic stack 110, wherein the pair of external electrodes (104a, 104b) are arranged to be electrically connected to internal electrodes 102 (102a, 102b).

External electrodes 104 (104a, 104b) are formed by, for example, baking a conductive paste containing a Cu powder as a conductive component. External electrodes 104 (104a, 104b) are also formed of sintered metal layers 105 (105a, 105b), which are formed to extend around from end surfaces 103 of ceramic body 110 to main surfaces and side surfaces thereof, and plating films 106 (106a, 106b) formed over the surfaces of sintered metal layers 105 (105a, 105b).

Note that plating films 106 (106a, 106b) include Ni-plating films 107 (107a, 107b) formed over surfaces of sintered metal layers 105 (105a, 105b), and Sn-plating films (108a, 108b) formed over Ni-plating films 107 (107a, 107b).

The above-described patent application publication describes that, according to the invention disclosed therein, a multilayer ceramic capacitor can be provided in which the Ni-plating films or the like are prevented from growing on surfaces of ceramic stack 110, and which includes external electrodes with excellent solder wettability.

The invention according to the above-described patent application publication, however, has a problem in that during the process of baking the conductive paste, diffusion of the metal material constituting the conductive paste into the internal electrodes may cause expansion of the internal electrodes, which, for example, may lead to cracks being formed from opposite end portions of uppermost and lowermost internal electrodes when seen from the end surface sides, toward the four corners of the ceramic body. Another problem is that reducing the temperature for baking the conductive paste in order to prevent the diffusion causes deterioration of the reliability of joining of the internal electrodes and the external electrodes.

SUMMARY OF THE INVENTION

Preferred embodiments of the present invention provide a highly reliable multilayer ceramic capacitor in which the formation of cracks in a ceramic body due to the diffusion of a metal constituting external electrodes into internal electrodes is significantly reduced or prevented, and a method for manufacturing the multilayer ceramic capacitor.

A multilayer ceramic capacitor according to a preferred embodiment of the present invention includes a ceramic body and a pair of external electrodes. The ceramic body includes a plurality of dielectric layers made of a dielectric ceramic and a plurality of internal electrodes stacked with each of the plurality of dielectric layers being interposed. The ceramic body has a rectangular or substantially rectangular parallelepiped-shape including a first main surface and a second main surface opposite to the first main surface, a first end surface perpendicular or substantially perpendicular to the first main surface and a second end surface opposite to the first end surface, and a first side surface perpendicular or substantially perpendicular to the first main surface and the first end surface, and a second side surface opposite to the first side surface. Assuming that a direction from the first main surface toward the second main surface is a thickness direction, a direction from the first end surface toward the second end surface is a longitudinal direction, and a direction from the first side surface toward the second side surface is a width direction, the thickness direction matches a direction in which the dielectric layers and the internal electrodes are stacked. The plurality of internal electrodes extend to the first end surface and the second end surface alternately in the thickness direction. The pair of external electrodes are each arranged on the ceramic body to be electrically connected to the respective internal electrodes extending to the first end surface and the second end surface. Each of the internal electrodes contain Ni. Each of the external electrodes include a sintered metal layer containing Cu, which is provided on the ceramic body and is electrically connected to the internal electrodes. At a joined portion of each of the internal electrodes and each of the external electrodes, a mutual diffusion layer of Cu and Ni extends across the internal electrode and the external electrode. The mutual diffusion layer is present on the internal electrode to have a thickness (depth), which is defined by a dimension from the first end surface or the second end surface to an interior end in the longitudinal direction, not smaller than about 0.5 µm and not greater than about 5 µm. The mutual diffusion layer is present on the external electrode to have a thickness (depth), which is defined by a dimension from the first end surface or the second end surface to an exterior end in the longitudinal direction, not smaller than about 2.5% and not greater than about 33.3% of a thickness of the sintered metal layer.

Through the adoption of the above-described structure, the formation of cracks in the ceramic body due to the diffusion of the metal constituting the external electrodes into the internal electrodes is significantly reduced or prevented. Thus, a highly reliable multilayer ceramic capacitor is able to be provided.

In a multilayer ceramic capacitor according to a preferred embodiment of the present invention, preferably, when the joined portion of each of the internal electrodes and each of the external electrodes is observed in a cross section including the longitudinal direction and the thickness direction, a joined ratio, which is defined by the number of internal electrodes joined to the external electrodes relative to a total number of the internal electrodes, is about 70% or more.

When the above-defined joined ratio of the internal electrodes and the external electrodes is about 70% or more, a multilayer ceramic capacitor having high reliability of the connection between the internal electrodes and the external electrodes can be provided. Note that the above-described phrase "joined ratio is about 70% or more" in a predetermined cross section refers to a situation in which about 30% or less of the internal electrodes not joined to the external electrodes in one cross section are likely to be joined to the external electrodes in any other cross section, so that it can be assumed that the internal electrodes and the external electrodes are joined at a probability sufficiently high for practical purposes.

In a multilayer ceramic capacitor according to a preferred embodiment of the present invention, preferably, a proportion of Cu in the mutual diffusion layer present on the external electrode is higher than a proportion of Cu in the mutual diffusion layer present on the internal electrode, and preferably, a proportion of Ni in the mutual diffusion layer present on the internal electrode is higher than a proportion of Ni in the mutual diffusion layer present on the external electrode.

When the proportion of Cu and the proportion of Ni in the mutual diffusion layer satisfy the above-described relation, a multilayer ceramic capacitor having high reliability of the connection between the internal electrodes and the external electrodes is able to be provided.

In a multilayer ceramic capacitor according to a preferred embodiment of the present invention, preferably, an oxide layer is present between the mutual diffusion layer and the internal electrodes.

The oxide layer present between the mutual diffusion layer and each internal electrode prevents a component (i.e., Cu) of the external electrodes from advancing over about 5 μm from an end surface of the ceramic body toward the interior of the internal electrode. As a result, the formation of the mutual diffusion layer excessively deep in the internal electrode is significantly reduced or prevented. Thus, a multilayer ceramic capacitor with good characteristics is able to be provided.

In a multilayer ceramic capacitor according to a preferred embodiment of the present invention, preferably, each of the external electrodes includes a Ni-plating film provided over the sintered metal layer and a Sn-plating film provided over the Ni-plating film.

When the external electrodes include the above-described structure of the Ni-plating film and the Sn-plating film, the Ni-plating film defines and functions as abase layer having excellent heat resistance, while the Sn-plating film defines and functions as a surface layer to enhance solder wettability. Thus, a multilayer ceramic capacitor having good solderability and high connection reliability is able to be provided for a case where the multilayer ceramic capacitor is mounted by soldering on a land electrode on a circuit board.

A method for manufacturing a multilayer ceramic capacitor according to a preferred embodiment of the present invention is a method for manufacturing a multilayer ceramic capacitor including a ceramic body and a pair of external electrodes, which includes the following steps (A) to (F): (A) forming, on a ceramic green sheet, an internal electrode pattern defining and functioning as an internal electrode after firing; (B) producing a mother stack by stacking the ceramic green sheet having the internal electrode pattern printed thereon and a ceramic green sheet without the internal electrode pattern, and pressing the ceramic green sheets; (C) obtaining an unfired ceramic stack by cutting the mother stack; (D) firing the unfired ceramic stack at a temperature not lower than about 900° C. and not higher than about 1300° C.; and (E) forming an oxide layer inside the internal electrode, by annealing the fired ceramic stack by holding the fired ceramic stack in a reducing atmosphere at a maximum temperature not lower than about 1000° C. and not higher than about 1200° C. for a period not shorter than about 0.5 hour and not longer than about 1.5 hours, and then cooling the fired ceramic stack in a nitrogen atmosphere; and (F) forming an external electrode main body serving as a base layer of the external electrodes, by applying a conductive paste to opposite end surfaces of the fired ceramic stack as the ceramic body, and baking the conductive paste.

Through the adoption of the above-described manufacturing method, the formation of cracks in the ceramic body due to the diffusion of the metal constituting the external electrodes into the internal electrodes is significantly reduced or prevented. Thus, a highly reliable multilayer ceramic capacitor is able to be provided.

Furthermore, according to the above-described method for manufacturing a multilayer ceramic capacitor according to a preferred embodiment of the present invention, the multilayer ceramic capacitor according to a preferred embodiment of the present invention is efficiently manufactured, because annealing is performed by holding the fired ceramic stack in a reducing atmosphere at a maximum temperature not lower than about 1000° C. and not higher than about 1200° C. for a period not shorter than about 0.5 hour and not longer than about 1.5 hours, and then cooling the fired ceramic stack in a nitrogen atmosphere.

That is, through the annealing as described above, it is possible to efficiently manufacture a multilayer ceramic capacitor including the mutual diffusion layer of Cu and Ni, or a multilayer ceramic capacitor in which the oxide layer is further present between the mutual diffusion layer and each of the internal electrodes, like the multilayer ceramic capacitor based on the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Features of the present invention will be described below in more detail, with reference to preferred embodiments of the present invention.

Figure 1:
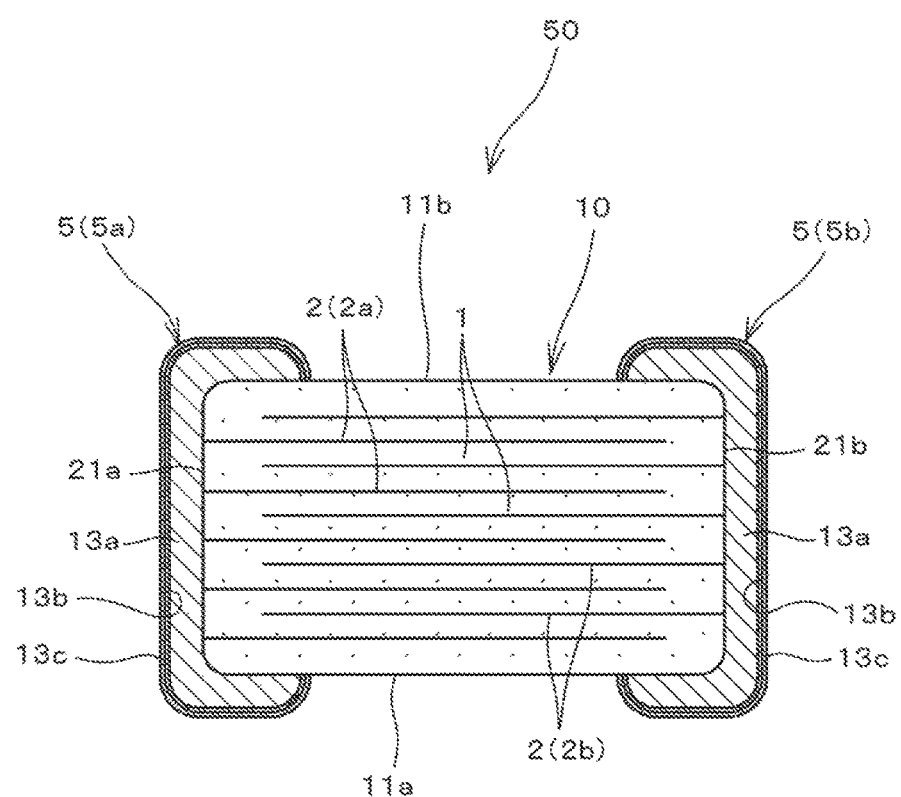
FIG. 1 is a front cross-sectional view showing the structure of a multilayer ceramic capacitor according to a preferred embodiment of the present invention.
Figure 2:
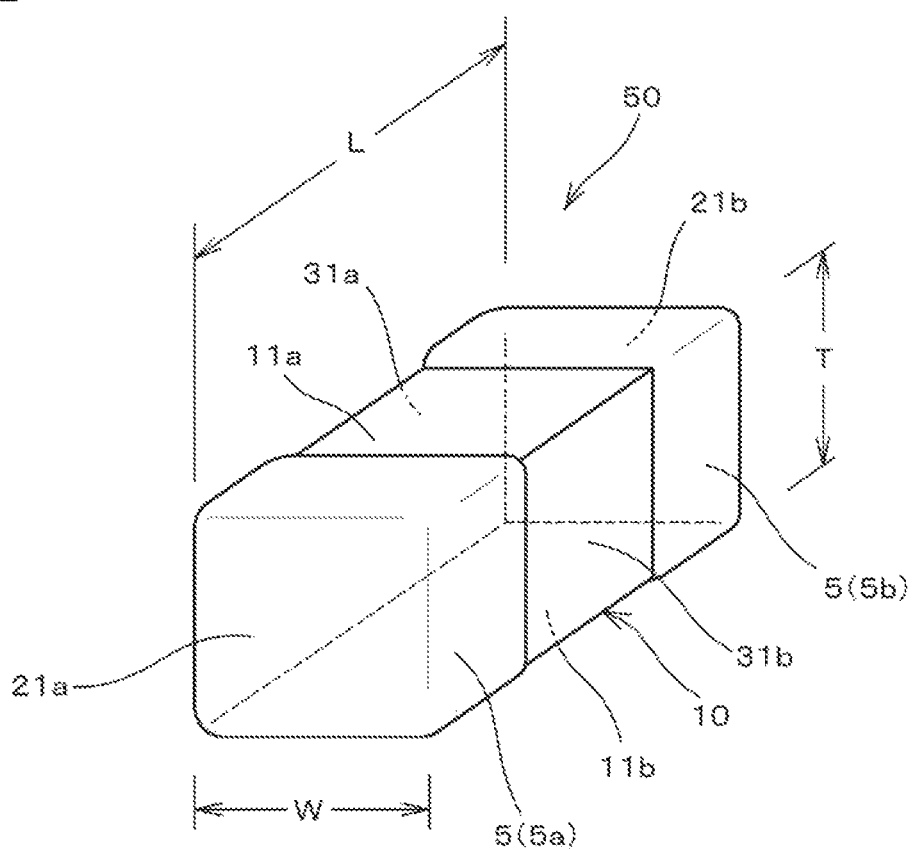
FIG. 2 is a perspective view showing an external structure of the multilayer ceramic capacitor according to a preferred embodiment of the present invention.
Figure 3:
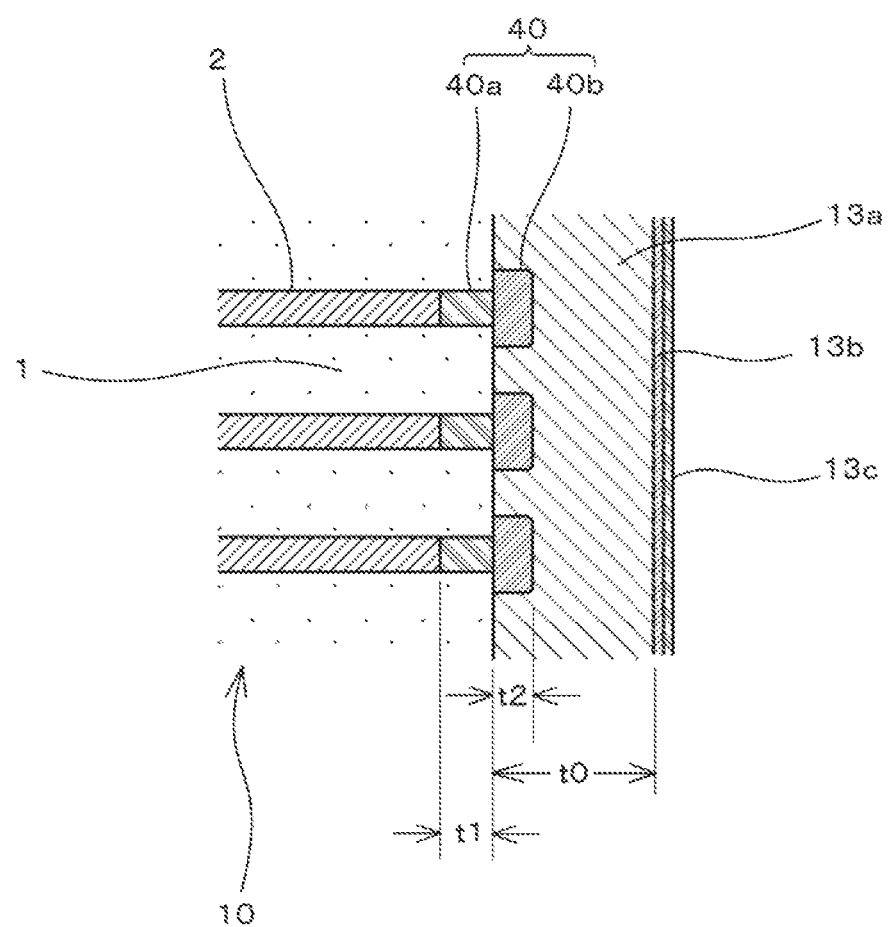
FIG. 3 is a cross-sectional view showing the structure of a principal portion of the multilayer ceramic capacitor according to a preferred embodiment of the present invention.
Figure 4:
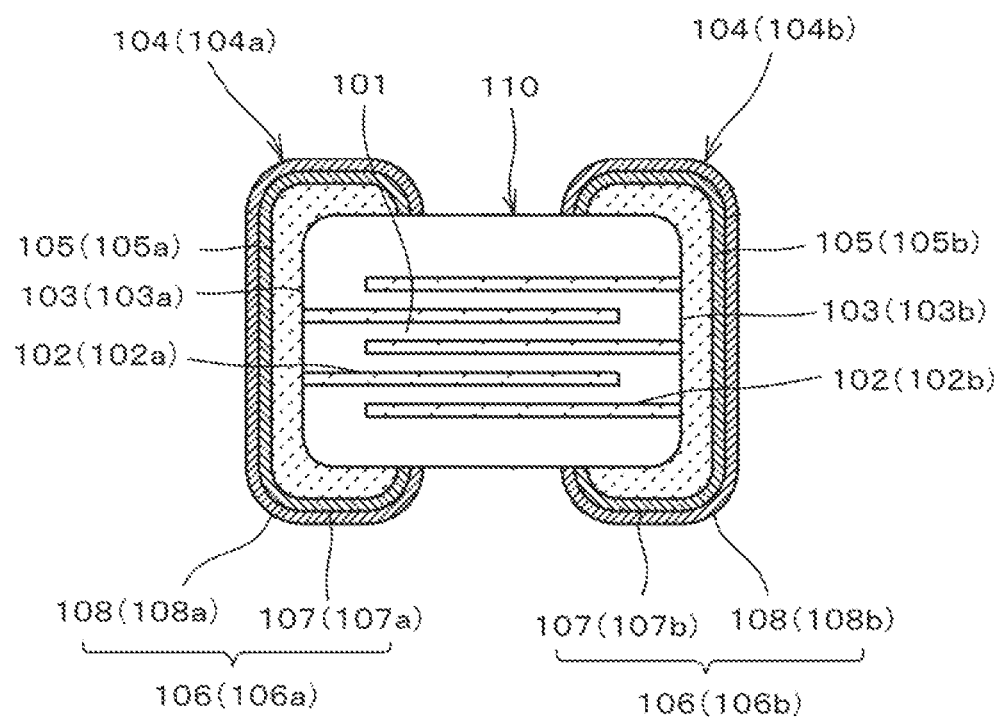
FIG. 4 is a front cross-sectional view showing the structure of external electrodes of a conventional multilayer ceramic capacitor.

FIG. 1 is a front cross-sectional view showing the structure of a multilayer ceramic capacitor 50 according to a preferred embodiment (first preferred embodiment) of the present invention. FIG. 2 is a perspective view showing an external structure of multilayer ceramic capacitor 50. FIG. 3 is a cross-sectional view showing the structure of a principal portion of multilayer ceramic capacitor 50.

As shown in FIGS. 1 and 2, multilayer ceramic capacitor 50 includes a ceramic body 10 including a plurality of dielectric layers 1 made of a dielectric ceramic and a plurality of internal electrodes 2 (2a, 2b) arranged at a plurality of interfaces located between the plurality of dielectric layers 1; and a pair of external electrodes 5 (5a, 5b) arranged on outer surfaces of ceramic body 10 to be electrically connected to internal electrodes 2 (2a, 2b).

Ceramic body 10 has a rectangular or substantially rectangular parallelepiped-shape including a first main surface 11a and a second main surface 11b opposite to first main surface 11a; a first end surface 21a perpendicular or substantially perpendicular to first main surface 11a and a second end surface 21b opposite to first end surface 21a; and a first side surface 31a perpendicular or substantially perpendicular to first main surface 11a and first end surface 21a, and a second side surface 31b opposite to first side surface 31a.

Note that a direction from first main surface 11a toward second main surface 11b of ceramic body 10 is assumed to be a thickness (T) direction, which is a direction in which dielectric layers 1 and internal electrodes 2 (2a, 2b) are stacked; a direction from first end surface 21a toward second end surface 21b of ceramic body 10 is assumed to be a longitudinal (L) direction; and a direction from first side surface 31a toward second side surface 31b of ceramic body 10 is assumed to be a width (W) direction (see FIG. 2).

Internal electrodes 2 (2a, 2b) are formed to be alternately exposed on first end surface 21a and second end surface 21b, respectively, of ceramic body 10. A material containing Ni as a main component is used as a conductive material constituting internal electrodes 2 (2a, 2b).

External electrodes 5 (5a, 5b) extend around from first end surface 21a and second end surface 21b, respectively, of ceramic body 10, to first main surface 11a and second main surface 11b as well as first side surface 31a and second side surface 31b. External electrodes 5 (5a, 5b) are electrically connected to internal electrodes 2 (2a, 2b), respectively, exposed on first end surface 21a and second end surface 21b.

Furthermore, each of external electrodes 5 (5a, 5b) includes a sintered metal layer (external electrode main body) 13a containing Cu provided on ceramic body 10; and a plating film 13b or 13c provided on external electrode main body 13a. External electrode main body 13a is formed preferably by applying a conductive paste containing a metal powder and a glass to first end surface 21a and second end surface 21b of ceramic body 11, followed by firing. A metal material containing Cu as a main component is used as a material constituting external electrode main body 13a.

Plating film 13b is formed over a surface of external electrode main body 13a, and Ni is used as a material of plating film 13b.

Plating film 13c is formed over a surface of plating film 13b, and Sn is used as a material constituting plating film 13c.

Other metals such as Pd, Cu, Au, and the like can also be used for plating film 13c as the outermost layer. Each of plating films 13b, 13c may have a thickness not smaller than about 0.1 μm and not greater than about 20 μm, for example.

In this preferred embodiment, plating films 13b, 13c preferably are formed using an electroplating method, for example.

While the two kinds of (two layers of) plating films, i.e., the Ni-plating films and the Sn-plating films, preferably are formed in this preferred embodiment, a plating film having a monolayer structure, or plating films having a multilayer structure of three or more layers can also be used.

Furthermore, in multilayer ceramic capacitor 50, at a joined portion of each of internal electrodes 2 (2a, 2b) and each of external electrodes 5 (5a, 5b), mutual diffusion layers 40 of Cu and Ni extend across internal electrode 2 and external electrode 5.

On internal electrode 2, a mutual diffusion layer 40a is present with a thickness (depth) not smaller than about 0.5 μm and not greater than about 5 μm, from first end surface 21a or second end surface 21b toward an interior side in the longitudinal direction.

On external electrode 5, a mutual diffusion layer 40b is present with a thickness (depth), which is defined by a dimension from first end surface 21a or second end surface 21b to an exterior end in the longitudinal direction, not smaller than about 2.5% and not greater than about 33.3% of a thickness of sintered metal layer (external electrode main body) 13a.

Note that the presence of mutual diffusion layers 40 (40a, 40b), as well as a thickness t1 of mutual diffusion layer 40a on internal electrode 2 and a thickness t2 of mutual diffusion layer 40b on external electrode 5, are examined using the following method.

A sample is produced by polishing multilayer ceramic capacitor 50 to one-half the chip dimension along a direction perpendicular or substantially perpendicular to first end surface 21a and first main surface 11a of ceramic body 10, and then milling any polishing sag of internal electrodes 2. Then, the sample produced as above is analyzed under the following conditions by means of WDX, for the measurement of elemental concentrations.

Pre-processing before observation: flat milling at 3 kV/5 min/60° C., followed by C-coating
Acceleration voltage: 15.0 kV
Illumination current: $5 \times 10^{-8}$ A
Magnification: 3000 times
Dwell time (time for capturing at one pixel): 40 ms
Analysis depth (referential): 1 to 2 μm Mutual diffusion layer 40a on the internal electrode is inspected along the longitudinal (L) direction of ceramic body 10, from first end surface 21a or second end surface 21b of ceramic body 10 toward internal electrode 2, and a distance from first end surface 21a or second end surface 21b to a point where the Cu element is no longer detected is defined as thickness t1 of mutual diffusion layer 40a on internal electrode 2.

Mutual diffusion layer 40b on external electrode 5 is inspected along a thickness direction of external electrode 5 (the longitudinal (L) direction of ceramic body 10) from first end surface 21a or second end surface 21b of ceramic body 10 toward external electrode 5, and a distance from first end surface 21a or second end surface 21b to a point where the Ni element is no longer detected is defined as thickness t2 of mutual diffusion layer 40b on external electrode 5.

The direction of analysis herein corresponds to the direction of the normal to the end surfaces.

As described above, in the multilayer ceramic capacitor according to a preferred embodiment of the present invention, thickness t1 of mutual diffusion layer 40a on the internal electrode is set not smaller than about 0.5 μm and not greater than about 5 μm, and thickness t2 of mutual diffusion layer 40b on the external electrode is set not smaller than about 2.5% and not greater than about 33.3% of a thickness t0 of sintered metal layer (external electrode main body) 13a.

If thickness t1 of mutual diffusion layer 40a on internal electrode 2 is smaller than about 0.5 μm, or if thickness t2 of mutual diffusion layer 40b on external electrode 5 is smaller than about 2.5% thickness t0 of sintered metal layer (external electrode main body) 13a, the reliability of the electrical connection between internal electrode 2 and external electrode 5 will decrease. Thus, repeated application of voltage and discharging may break the connection between internal electrode 2 and external electrode 5, leading to a decrease in capacitance (poor capacitance).

On the other hand, if thickness t1 of mutual diffusion layer 40a on internal electrode 2 exceeds about 5 µm, the thickness of internal electrode 2 will increase due to mutual diffusion layer 40a. This may cause cracks to be readily formed from the opposite end portions of uppermost and lowermost internal electrodes 2 in the stack direction, when seen from the first end surface 21a side or from the second end surface 21b side of ceramic body 10 on which external electrodes 2 are exposed, toward the four corners of ceramic body 10.

Furthermore, a chemical reaction in a plating step of forming plating films 13b, 13c described above produces hydrogen ions, which may be occluded into internal electrodes 2 to cause gradual reduction of surrounding dielectric layers 1, leading to a problem such as deterioration of the insulation resistance or the like. The intrusion of hydrogen into ceramic body 10 can thus be prevented by providing mutual diffusion layer 40b on external electrode 5, and by keeping thickness t2 of mutual diffusion layer 40b on external electrode 5 not greater than about 33.3% of thickness t0 of sintered metal layer 13a.

Note that if the thickness of mutual diffusion layer 40b on external electrode 5 exceeds about 33.3% of thickness t0 of sintered metal layer 13a, hydrogen will readily intrude through Ni contained in mutual diffusion layers 40.

The multilayer ceramic capacitor according to this preferred embodiment further includes an oxide layer on an internal electrode-side of the mutual diffusion layers. The oxide layer, however, may not necessarily be present adjacent to the mutual diffusion layers, and may be present at a distance from the mutual diffusion layers. This oxide layer prevents the diffusion of the material constituting the external electrodes from advancing beyond about 5 µm toward the interior of the internal electrodes. Note that the presence of the oxide layer can be examined by means of WDX, using a method similar to that for examining the presence and the thicknesses of the mutual diffusion layers.

Furthermore, in the multilayer ceramic capacitor according to this preferred embodiment, preferably, at least one kind of an element forming a covalent hydride with hydrogen (however, except for an element generating a hydride having a boiling point lower than about 125° C.) and an element forming a hydride of a boundary region with hydrogen is contained between plating layers 13c as the outermost layers of plating layers 13b, 13c (FIG. 1) on the surface of the external electrode main body and ceramic layers (outermost layers) 2 of ceramic body 10.

Note that the element forming a covalent hydride with hydrogen (however, except for an element generating a hydride having a boiling point lower than about 125° C.) is an element capable of forming a compound with hydrogen, for example, an element belonging to the boron group except for In and Tl (B, Al, and Ga), the carbon group (C, Si, Ge, Sn, and Pb), the nitrogen group (N, P, As, Sb, and Bi), the oxygen group (O, S, Se, Te, and Po), and halogens (F, l, Br, I, and At) in the long-form periodic table. Moreover, the element forming a hydride of a boundary region with hydrogen is an element capable of forming a compound with hydrogen, for example, an element which is at a boundary between the covalent hydride and the metal-like hydride, and belongs to the boron group except for Al and Ga (In and Tl), Group 11 (Cu, Ag, and Au), and Group 12 (Zn, Cd, and Hg) in the long-form periodic table. These elements form a stable compound with hydrogen. In other words, these elements have a property that, once being bonded with hydrogen, energy is required to separate the hydrogen, so that the hydrogen is unlikely to be released. Utilizing this property, hydrogen produced in the plating step is able to be held in a path from the external electrodes through the mutual diffusion layers to the internal electrodes, thus preventing further intrusion of hydrogen.

Note that in order to allow external electrode main body 13a included in a portion of the above-described path to contain a hydrogen-holding element, a powder of the hydrogen-holding element in a metallic state (hydrogen-holding metal powder) is blended into the conductive paste for forming external electrode main body 13a. The hydrogen-holding metal powder is preferably blended in the conductive paste in a solids content ratio not less than about 1 vol % and not more than about 40 vol %.

Note that the hydrogen-holding metal may be present as a single metal in external electrode main body 13a, or in some cases, may be dispersed or alloyed with other metal in external electrode main body 13a.

A non-limiting example of a method for manufacturing the above-described multilayer ceramic capacitor according to a preferred embodiment of the present invention will be described next.

(1) First, ceramic green sheets, a conductive paste for forming internal electrodes, and a conductive paste for forming an external electrode main body (sintered metal layer) are prepared.

The ceramic green sheets and each of the conductive pastes contain a binder and a solvent. A conventional organic binder and organic solvent may be used as the binder and the solvent.

(2) The conductive paste is printed using, for example, screen printing, in a predetermined pattern on ceramic green sheets produced in (1) above, thus forming an internal electrode pattern.

(3) A mother stack is produced by stacking a predetermined number of ceramic green sheets without the internal electrode pattern being printed thereon (ceramic green sheets for outer layers) produced in (1) above; sequentially stacking thereon the ceramic green sheets on which the internal electrode pattern is formed in (2) above; and stacking thereon a predetermined number of ceramic green sheets for outer layers without the internal electrode pattern being printed thereon.

(4) The mother stack is pressed in the stack direction using a hydrostatic pressure press or the like.

(5) The pressed mother stack is cut to a predetermined size, and is thus divided into individual unfired ceramic stacks. At this time, corners and ridges of the individual unfired ceramic stacks may be rounded by chamfering using barrel polishing or the like.

(6) The unfired ceramic stacks are fired. Generally, the firing temperature is preferably not lower than about 900° C. and not higher than about 1300° C., although it may depend on the ceramic and the material of the internal electrodes.

(7) An oxide layer is formed inside the internal electrodes by annealing each of the individual fired ceramic stacks.

The annealing is performed herein by holding each fired ceramic stack in a reducing atmosphere at a maximum temperature not lower than about 1000° C. and not higher than about 1200° C. for a period not shorter than about 0.5 hour and not longer than about 1.5 hours, and then cooling the fired ceramic stack in a nitrogen atmosphere.

(8) The conductive paste for forming the external electrode main body (sintered metal layer) is applied to opposite end surfaces of the fired ceramic stack, and then baked, thus forming an external electrode main body (sintered metal layer) serving as a base layer of external electrodes. Generally, the baking temperature is preferably not lower than about 700° C. and not higher than about 900° C.

In this step, a mutual diffusion layer in which Cu contained in the external electrodes and Ni contained in the internal electrodes are diffused into each other is formed at a joined portion of each internal electrode and each external electrode, to extend across the internal electrode and the external electrode.

(9) Then, the external electrode main body (sintered metal layer) is Ni-plated to form a Ni-plating film over the external electrode main body (sintered metal layer), and is additionally Sn-plated to form a Sn-plating film over the Ni-plating film.

In this manner, a multilayer ceramic capacitor as shown in FIGS. 1 and 2 is obtained.

Experimental Example 1

In order to confirm the significance of the multilayer ceramic capacitor according to this preferred embodiment, samples (multilayer ceramic capacitors) of Sample Nos. 1 to 10 shown in Table 1 were produced using a conductive paste obtained by adding Sn to a conductive paste containing a Cu powder as a conductive material.

Note that a detailed specification of the conductive paste was set as follows.

Solids content: 25 vol %
Ratio of the Cu powder in the solids content: 70 vol %
Ratio of a glass in the solids content: 25 vol %
Ratio of Sn in the solids content: 5 vol %
Particle size of the Cu powder: 3 μm
Particle size of the glass: 2 μm
Composition of the glass: BaO—SrO—$B_2O_3$—$SiO_2$-based glass frit (glass with glass frit containing 10 to 50 wt % of BaO, 3 to 30 wt % of $B_2O_3$, and 3 to 30 wt % of $SiO_2$ in terms of oxides)

When producing the samples of Sample Nos. 1 to 10 shown in Table 1, this conductive paste was applied to first end surface 21a and second end surface 21b of ceramic body 10, and fired to form external electrode main body (sintered metal layer) 13a (see FIG. 1).

After that, plating layer 13b made of Ni was formed on an outer side of external electrode main body 13a by electroplating, and plating layer 13c made of Sn was further formed on an outer side thereof by electroplating.

In this manner, the samples of Sample Nos. 1 to 10 shown in Table 1 were obtained.

The produced multilayer ceramic capacitors generally had a capacitance of about 10 μF, a rated voltage of about 6.3V, dimensions having a length of about 1.0 mm, a width of about 0.5 mm, and a height of about 0.5 mm, plating layer 13b with a thickness of about 3 μm, and plating layer 13c with a thickness of about 3 μm.

In this preferred embodiment, samples including external electrode main body 13a with a thickness of about 10 μm (samples of Sample Nos. 1 to 6 in Table 1) and samples including external electrode main body 13a with a thickness of about 5 μm (samples of Sample Nos. 7 to 10 in Table 1) were produced.

In each of the samples of Sample Nos. 1 to 10 in Table 1, the thickness of mutual diffusion layer 40a on internal electrode 2 was set to about 3 μm, so as to meet the requirement of the present invention.

Then, each of the samples of Sample Nos. 1 to 10 in Table 1 produced as above was subjected to a high-temperature load test and a zero-Ω discharge test, using the methods described below.

High-Temperature Load Test

Each sample was allowed to stand for 72 hours with the temperature and the voltage being set under the following conditions:

Temperature: 125° C.

Applied voltage: 3.2 V.

Insulation resistance LogIR was then examined. Samples having a LogIR lower than 0.5 were counted as defective samples. Note that the number of tested samples was 20.

Zero-Ω Discharge Test

Each sample was heat-treated at a temperature of 150° C. for an hour, and then allowed to stand for 24 hours. Capacitance was then measured for each sample.

Then, each sample was discharged (zero-Ω discharge) by applying a voltage of 20 V for 5 seconds, and then dropping the sample onto a stainless plate. This was repeated five times.

The sample was then heat-treated at a temperature of 150° C. for an hour, and then allowed to stand for 24 hours, after which a capacitance thereof was measured. Samples having a 5% or more decrease in capacitance were counted as defective samples. Note that the number of tested samples was 20.

Results of both the high-temperature load test and the zero-Ω discharge test performed as described above are shown in Table 1. Note that the samples with * shown in Table 1 are those not meeting the requirements of preferred embodiments of the present invention.

TABLE 1

| Sample Nos. | Thickness (μm) of External Electrode Main Body | Thickness (μm) of Mutual Diffusion Layer on External Electrode | Ratio (%) of Thickness of Mutual Diffusion Layer on External Electrode Relative to Thickness of External Electrode Main Body | Number of Defective Samples in High-Temperature Load Test | Number of Defective Samples in Zero-Ω Discharge Test |
|---|---|---|---|---|---|
| 1* | 40 | 0.1 | 0.25 | 0/20 | 3/20 |
| 2 | 40 | 1.0 | 2.5 | 0/20 | 0/20 |
| 3 | 40 | 3.1 | 7.8 | 0/20 | 0/20 |
| 4 | 40 | 4.3 | 10.8 | 0/20 | 0/20 |
| 5 | 40 | 13.2 | 33.3 | 0/20 | 0/20 |
| 6* | 40 | 20 | 50 | 10/20 | 0/20 |
| 7* | 30 | 0.3 | 1 | 0/20 | 3/20 |

TABLE 1-continued

| Sample Nos. | Thickness (μm) of External Electrode Main Body | Thickness (μm) of Mutual Diffusion Layer on External Electrode | Ratio (%) of Thickness of Mutual Diffusion Layer on External Electrode Relative to Thickness of External Electrode Main Body | Number of Defective Samples in High-Temperature Load Test | Number of Defective Samples in Zero-Ω Discharge Test |
|---|---|---|---|---|---|
| 8 | 30 | 1.3 | 4.3 | 0/20 | 0/20 |
| 9 | 30 | 6.1 | 20.3 | 0/20 | 0/20 |
| 10* | 30 | 13.4 | 44.6 | 14/20 | 0/20 |

According to Table 1, for samples of Sample Nos. 2 to 5, 8, and 9 in which the ratio of the thickness of the mutual diffusion layer on the external electrode relative to the thickness of the external electrode main body was not smaller than about 2.5% and not greater than about 33.3%, the occurrence of defective samples was not observed in the high-temperature load test and the zero-Ω discharge test.

On the other hand, for the samples of Sample Nos. 1 and 7 in which the ratio of the thickness of the mutual diffusion layer on the external electrode relative to the thickness of the external electrode main body was below the range of preferred embodiments of the present invention, i.e., about 0.25% or about 1%, respectively, the occurrence of defective samples was observed in the zero-Ω discharge test.

Moreover, for the samples of Sample Nos. 6 and 10 in which the ratio of the thickness of the mutual diffusion layer on the external electrode relative to the thickness of the external electrode main body was above the range of the present invention, i.e., about 50% or about 44.6%, respectively, the occurrence of defective samples was observed in the high-temperature load test.

Thus, the thickness of the mutual diffusion layer on the external electrode is preferably set in the range not smaller than about 2.5% and not greater than about 33.3% of the thickness of the external electrode main body.

Furthermore, the joined ratio of the internal electrodes and the external electrodes was examined for the samples of Sample Nos. 2 to 5, 8, and 9 in which the ratio of the thickness of the mutual diffusion layer on the external electrode relative to the thickness of the external electrode main body was not smaller than about 2.5% and not greater than about 33.3% (samples meeting the requirement of the present invention).

As used herein, the joined ratio of the internal electrodes and the external electrodes refers to the number of internal electrodes joined to the external electrodes relative to a total number of the internal electrodes, when the joined portion of each internal electrode and each external electrode is observed by means of WDX in a cross section including the longitudinal direction and the thickness direction of the ceramic body.

Furthermore, when a peak intensity of Cu over 12.5% was present from the observation of the joined portion by means of WDX, it was determined that the external electrode and the internal electrode was joined.

Results of the examination of the joined ratio of the internal electrodes and the external electrodes as described above confirmed that the samples of Sample Nos. 2 to 5, 8, and 9 meeting the requirement of the present invention exhibited a joined ratio of about 70% or more.

Furthermore, in the samples of Sample Nos. 2 to 5, 8, and 9 in which the ratio of the thickness of the mutual diffusion layer on the external electrode relative to the thickness of the external electrode main body was in the range not smaller than about 2.5% and not greater than about 33.3% (samples meeting the requirement of the present invention), the proportion of Cu in the mutual diffusion layer present on the external electrode was confirmed to be higher than the proportion of Cu in the mutual diffusion layer present on the internal electrode, and the proportion of Ni in the mutual diffusion layer present on the internal electrode was confirmed to be higher than the proportion of Ni in the mutual diffusion layer present on the external electrode.

Note that the thickness of the mutual diffusion layer on the internal electrode can be measured by drawing a line segment passing through the external electrode along the internal electrode, and measuring the thickness of the mutual diffusion layer on the line segment.

The thickness of the mutual diffusion layer is also an average value of values obtained by selecting equally arranged 10 layers from the internal electrodes aligned in the stack direction, and measuring a thickness of the mutual diffusion layer relative to each of the 10 internal electrode layers.

Furthermore, for the samples of Sample Nos. 2 to 5, 8, and 9 in which the ratio of the thickness of the mutual diffusion layer on the external electrode relative to the thickness of the external electrode main body was in the range not smaller than about 2.5% and not greater than about 33.3% (samples meeting the requirement of the present invention), the presence of an oxide layer between the mutual diffusion layer and the internal electrode was confirmed.

Experimental Example 2

Samples of Sample Nos. 11 to 15 shown in Table 2 were produced in the same manner as that for the samples according to Experimental Example 1 above (samples shown in Table 1), except that the thickness of the external electrode main body was set to about 40 μm, and the thickness of the mutual diffusion layer on the external electrode was set to about 10% of the thickness of the external electrode main body, and that the thickness of the mutual diffusion layer on the internal electrode was varied in the range from about 0.2 μm to about 7 μm.

Each of the produced samples was then subjected to a test for examining the number of cracks and the zero-Ω discharge test.

Note that the number of cracks was examined as follows: each sample was polished from surfaces (end surfaces of the ceramic body on which the external electrodes were formed) including the thickness direction and the width direction of the sample (multilayer ceramic capacitor); the polishing was stopped at the point (polishing depth) where the external electrodes were removed; and corners of the sample were observed with a microscope.

Specifically, five samples were examined for the presence or absence of cracks formed from opposite end portions of uppermost and lowermost internal electrodes when seen from the end surface sides, toward the four corners of the ceramic body.

Note that when the five samples were examined for the presence of cracks toward the four corners as described above, a total number of areas to be measured was 20. Table 2 shows, as the number of cracks, the number of areas where cracks formed among these 20 areas.

Moreover, the number of defective samples in the zero-Ω discharge test shown in Table 2 was examined in the same manner as that for each of the samples in Table 1.

Note that the samples with shown in Table 2 are those not meeting the requirement of the present invention.

TABLE 2

| Sample Nos. | Thickness (μm) of Mutual Diffusion Layer on Internal Electrode | Number of Cracks | Number of Defective Samples in Zero-Ω Discharge Test |
|---|---|---|---|
| 11* | 0.2 | 0/20 | 4/20 |
| 12 | 0.5 | 0/20 | 0/20 |
| 13 | 3 | 0/20 | 0/20 |
| 14 | 5 | 0/20 | 0/20 |
| 15* | 7 | 7/20 | 0/20 |

As shown in Table 2, for the samples of Sample Nos. 12 to 14 in which the thickness of the mutual diffusion layer on the internal electrode was in the range not smaller than about 0.5 μm and not greater than about 5 μm, it was confirmed that the formation of cracks was not observed, and the occurrence of defective samples in the zero-Ω discharge test was not observed.

On the other hand, the occurrence of defective samples in the zero-Ω discharge test was observed for the sample of Sample No. 11 in which the thickness of the mutual diffusion layer on the internal electrode was below the range of the present invention, i.e., about 0.2 μm.

Furthermore, the formation of cracks was confirmed for the sample of Sample No. 15 in which the thickness of the mutual diffusion layer on the internal electrode was above the range of the present invention, i.e., about 7 μm.

Thus, the thickness of the mutual diffusion layer on the internal electrode is preferably set in the range not smaller than about 0.5 μm and not greater than about 5 μm. Note that the thickness of the mutual diffusion layer on the internal electrode can be measured by drawing a line segment passing through the external electrode along the internal electrode, and measuring the thickness of the mutual diffusion layer on the line segment. The thickness of the mutual diffusion layer is also an average value of values obtained by selecting equally arranged 10 layers from the internal electrodes aligned in the stack direction, and measuring a thickness of the mutual diffusion layer relative to each of the 10 internal electrode layers.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a ceramic body; and
a pair of external electrodes; wherein
the ceramic body includes a plurality of dielectric layers made of a dielectric ceramic and a plurality of internal electrodes stacked with the plurality of dielectric layers being interposed;
the ceramic body having a rectangular or substantially rectangular parallelepiped-shape including a first main surface and a second main surface opposite to the first main surface, a first end surface perpendicular or substantially perpendicular to the first main surface and a second end surface opposite to the first end surface, and a first side surface perpendicular or substantially perpendicular to the first main surface and the first end surface, and a second side surface opposite to the first side surface;
assuming that a direction from the first main surface toward the second main surface is a thickness direction, a direction from the first end surface toward the second end surface is a longitudinal direction, and a direction from the first side surface toward the second side surface is a width direction, the thickness direction matching a direction in which the dielectric layers and the internal electrodes are stacked;
the plurality of internal electrodes extend to the first end surface and the second end surface alternately in the thickness direction;
each of the pair of external electrodes is electrically connected to the respective internal electrodes extending to the first end surface and the second end surface;
each of the internal electrodes includes Ni;
each of the external electrodes includes a sintered metal layer containing Cu, the sintered metal layer being provided on the ceramic body and being electrically connected to the internal electrodes;
a mutual diffusion layer of Cu and Ni is present at a joined portion of each of the internal electrodes and each of the external electrodes to extend across the internal electrode and the external electrode;
the mutual diffusion layer is present on the internal electrode to have a thickness, which is defined by a dimension from the first end surface or the second end surface to an interior end in the longitudinal direction, not smaller than about 0.5 μm and not greater than about 5 μm; and
the mutual diffusion layer is present on the external electrode to have a thickness, which is defined by a dimension from the first end surface or the second end surface to an exterior end in the longitudinal direction, not smaller than about 2.5% and not greater than about 33.3% of a thickness of the sintered metal layer.

2. The multilayer ceramic capacitor according to claim 1, wherein when the joined portion of each of the internal electrodes and each of the external electrodes is observed in a cross section including the longitudinal direction and the thickness direction, a joined ratio, which is defined by the number of internal electrodes joined to the external electrodes relative to a total number of the internal electrodes, is about 70% or more.

3. The multilayer ceramic capacitor according to claim 1, wherein
a proportion of Cu in the mutual diffusion layer present on the external electrode is higher than a proportion of Cu in the mutual diffusion layer present on the internal electrode; and
a proportion of Ni in the mutual diffusion layer present on the internal electrode is higher than a proportion of Ni in the mutual diffusion layer present on the external electrode.

4. The multilayer ceramic capacitor according to claim 1, wherein an oxide layer is present between the mutual diffusion layer and the internal electrodes.

5. The multilayer ceramic capacitor according to claim 1, wherein each of the external electrodes includes a Ni-plating film provided over the sintered metal layer and a Sn-plating film provided over the Ni-plating film.

6. The multilayer ceramic capacitor according to claim 5, wherein each of the Ni-plating film and the Sn-plating film has a thickness of not smaller than about 0.1 μm and not greater than about 20 μm.

7. The multilayer ceramic capacitor according to claim 1, wherein each of the external electrodes includes a Ni-plating film provided over the sintered metal layer and another plating film provided over the Ni-plating film, the another plating film is formed of one of Pd, Cu, and Au.

8. The multilayer ceramic capacitor according to claim 7, wherein each of the Ni-plating film and the another film has a thickness of not smaller than about 0.1 μm and not greater than about 20 μm.

9. The multilayer ceramic capacitor according to claim 1, wherein each of the external electrodes includes at least two plating layers provided over the sintered metal layer made of a same plating material.

10. The multilayer ceramic capacitor according to claim 1, wherein each of the external electrodes includes at least two plating layers provided over the sintered metal layer made of different plating material.

11. A method for manufacturing a multilayer ceramic capacitor, the multilayer ceramic capacitor including a ceramic body and a pair of external electrodes, the method comprising the steps of:
    forming, on a ceramic green sheet, an internal electrode pattern that defines and functions as an internal electrode after firing;
    producing a mother stack by stacking the ceramic green sheet having the internal electrode pattern printed thereon and a ceramic green sheet without the internal electrode pattern, and pressing the ceramic green sheets;
    obtaining an unfired ceramic stack by cutting the mother stack;
    firing the unfired ceramic stack at a temperature not lower than about 900° C. and not higher than about 1300° C.; and
    forming an oxide layer inside the internal electrode, by annealing the fired ceramic stack by holding the fired ceramic stack in a reducing atmosphere at a maximum temperature not lower than about 1000° C. and not higher than about 1200° C. for a period not shorter than about 0.5 hour and not longer than about 1.5 hours, and then cooling the fired ceramic stack in a nitrogen atmosphere; and
    forming an external electrode main body defining and functioning as a base layer of the external electrodes, by applying a conductive paste to opposite end surfaces of the fired ceramic stack as the ceramic body, and baking the conductive paste; wherein
    in the step of forming the external electrode main body, a mutual diffusion layer of Cu and Ni is formed at a joined portion of each of the internal electrodes and each of the external electrodes to extend across the internal electrode and the external electrode;
    the mutual diffusion layer is present on the internal electrode to have a thickness, which is defined by a dimension from the first end surface or the second end surface to an interior end in the longitudinal direction, not smaller than about 0.5 μm and not greater than about 5 μm; and
    the mutual diffusion layer is present on the external electrode to have a thickness, which is defined by a dimension from the first end surface or the second end surface to an exterior end in the longitudinal direction, not smaller than about 2.5% and not greater than about 33.3% of a thickness of the sintered metal layer.

12. The method according to claim 11, wherein when the joined portion of each of the internal electrodes and each of the external electrodes is observed in a cross section including the longitudinal direction and the thickness direction, a joined ratio, which is defined by the number of internal electrodes joined to the external electrodes relative to a total number of the internal electrodes, is about 70% or more.

13. The method according to claim 11, wherein
    a proportion of Cu in the mutual diffusion layer present on the external electrode is higher than a proportion of Cu in the mutual diffusion layer present on the internal electrode; and
    a proportion of Ni in the mutual diffusion layer present on the internal electrode is higher than a proportion of Ni in the mutual diffusion layer present on the external electrode.

14. The method according to claim 11, wherein an oxide layer is present between the mutual diffusion layer and the internal electrodes.

15. The method according to claim 11, wherein each of the external electrodes includes a Ni-plating film provided over the sintered metal layer and a Sn-plating film provided over the Ni-plating film.

16. The method according to claim 15, wherein each of the Ni-plating film and the Sn-plating film has a thickness of not smaller than about 0.1 μm and not greater than about 20 μm.

17. The method according to claim 11, wherein each of the external electrodes includes a Ni-plating film provided over the sintered metal layer and another plating film provided over the Ni-plating film, the another plating film is formed of one of Pd, Cu, and Au.

18. The method according to claim 17, wherein each of the Ni-plating film and the another film has a thickness of not smaller than about 0.1 μm and not greater than about 20 μm.

19. The method according to claim 11, wherein each of the external electrodes includes at least two plating layers provided over the sintered metal layer made of a same plating material.

20. The method according to claim 11, wherein each of the external electrodes includes at least two plating layers provided over the sintered metal layer made of different plating material.

* * * * *